US005927461A

United States Patent [19]
Jamieson

[11] Patent Number: 5,927,461
[45] Date of Patent: Jul. 27, 1999

[54] APPARATUS FOR AUTOMATICALLY SEALING AN ARTICULATED CHUTE

[75] Inventor: John W. Jamieson, Alamo, Calif.

[73] Assignee: Forfam Incorporated, Alamo, Calif.

[21] Appl. No.: 08/785,670

[22] Filed: Jan. 17, 1997

[51] Int. Cl.[6] .................... B65G 11/00
[52] U.S. Cl. .................... 193/6; 366/68
[58] Field of Search .................... 193/2 R, 5, 6, 193/10, 21, 25 R, 4; 366/68

[56] References Cited

U.S. PATENT DOCUMENTS

| | | | |
|---|---|---|---|
| 3,068,981 | 12/1962 | Stegmeier et al. | 193/10 |
| 5,186,299 | 2/1993 | Stimson | 193/21 X |
| 5,354,128 | 10/1994 | Lewis | 193/6 X |
| 5,605,398 | 2/1997 | Cronquist | 366/68 |

*Primary Examiner*—James R. Bidwell
*Attorney, Agent, or Firm*—Michael J. Cronin

[57] ABSTRACT

A mechanical device for automatically positioning a closure plate for sealing the opening created by the folding of adjacent segments of an articulated chute to thereby prevent undesired discharge or leakage from the chute is provided. The device, which is particularly useful on cement trucks, includes a closure plate rotatably connected to one segment of the chute and disposed to articulate upon an adjacent segment of the chute so that the closure plate seals the opening when the chute is in a folded configuration and, when the segments are unfolded to deliver a charge, rotates to a position clear of the discharge path. The device also includes means for sealably biasing the closure plate toward the opening when the segments are folded and for biasing the closure plate away from the discharge path when the segments are in an unfolded position.

44 Claims, 4 Drawing Sheets

FIGS. 4 & 5
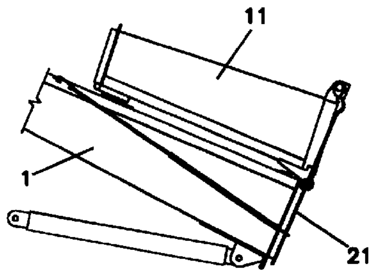
FIG. 4A
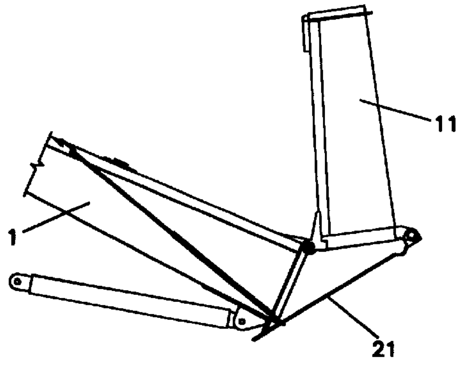
FIG. 4B
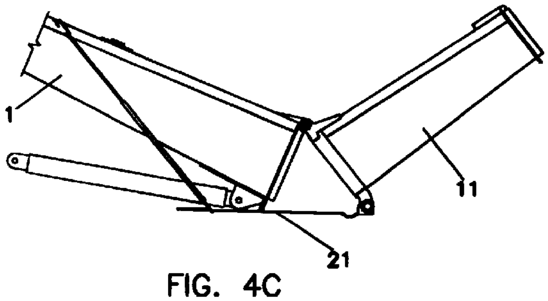
FIG. 4C
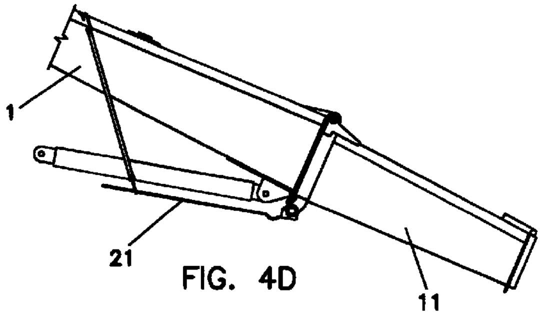
FIG. 4D
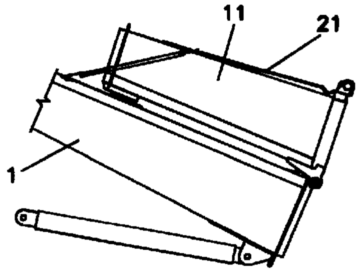
FIG. 5

APPARATUS FOR AUTOMATICALLY SEALING AN ARTICULATED CHUTE

FIELD OF THE INVENTION

The present invention relates to means and methods for sealing and unsealing articulated delivery chutes such as those used to deliver concrete from a truck or reservoir to a specific site and particularly to devices and methods which prevent the unwanted discharge of excess or undelivered material from articulated delivery chutes.

BACKGROUND OF THE INVENTION

Concrete mixers, and particularly those mounted on vehicles, are very important to the construction industry because they are necessary for mixing concrete and for the timely transportation of concrete to construction sites for pouring into forms or cavities. Many concrete mixers discharge the mixed concrete down the discharge path of an articulated chute of two or more sections to or near the specific location desired. Many on-site concrete mixers employ similar articulated chutes or tubes to deliver mixed concrete to a desired specific location.

A necessary part of the concrete delivery and pouring process is the cleaning of the delivery chute to thereby prevent the buildup of hardened concrete in the mixer and on chute discharge path surfaces. In the past, after discharging the load from the mixer, the chute was washed clean with water, and the resulting residue dumped in vacant land or fields. This concrete residue created environmental problems, as it hardened, making the soil unworkable. In addition, the contamination of the soil by the concrete liquids and solids killed plant life, prevented future growth of plants, contaminated water-ways and was a source of injury to humans and animals.

Because of these disadvantages of the concrete pouring process, many jurisdictions now prohibit the washing of concrete residues from concrete chutes. As these disadvantages become more well-known, many cities and towns are expected to have such prohibitions in the near future. As a result of such present laws, chutes are now only scraped after delivery of the concrete, as best as can be accomplished with a scraper, shovel or similar device. The amount of concrete residue remaining in the chute varies greatly, depending upon the consistency of the slurry, the abilities and motivation of the operator, and the time permitted for achieving the cleaning of concrete residues from the chute after delivery.

Such concrete residues can constitute a major safety hazard, because concrete delivery vehicles travel on public roads and highways in order to return to their fixed base or batching plant. During such travel, loose particles, aggregate rocks and clumps of concrete sometimes fall from the chute, which often results in damage such as broken windshields, dents, and damaged paint to other vehicles on the highway. In addition, the unwanted discharge of concrete may also result in injury or death to people struck by such particles, aggregate rocks and clumps. Unwanted discharge may result also in vehicular accidents. As a consequence of these hazards, it is unlawful to drop or discharge anything onto public roads and highways.

U.S. Pat. No. 5,354,128 to Lewis discloses canvas cap, configured to be manually stretched, by the operator of a cement truck, over the end of a folded chute, and fastened thereto by multiple elastic cords. This canvas device of Lewis is not substantial enough to withstand the load and wear and tear that is encountered during the normal operation of a cement truck. Because of these deficiencies, the canvas develops tears and holes through which leak cement or concrete aggregate onto streets, highways, and other locations to thereby create inconvenience and hazards. In addition, these canvas devices are sometimes blown from the vehicles while they are traveling at high speed on the highway. An additional problem with canvas covers is that they necessitate the intervention of cement vehicle drivers in placing and securing the cover to the chute after each operation. As a result, cement truck drivers frequently discard the device, thereby leading to a loss of protection, potential liability from unwanted discharge onto other vehicles and onto the highway, and conflict between drivers and company management. These deficiencies result in the problems and dangers listed above.

U.S. Pat. No. 5,186,299 to Stimson shows another device which attempts to solve the problems common to cement truck chutes but falls far short of doing so. The device of Stimson is a manually installed, rigid closure, which blocks the discharge path from the truck to the end of a cement chute but only at the end of an unfolded chute. Thus, the Stimson device does not seal the opening created by the folded segments of a chute and therefore does not function to prevent the unwanted discharge of concrete when a delivery vehicle to which it is attached is in transit on roads and highways. In addition, the Stimson closure is not permanently attached to the chute. Because of this, use of the device presents the added problem of accidents due to loss of the closure during transit, that is, the possibility of the Stimson device falling off of the truck while it is moving.

Accordingly, there remains an important and urgent need for an apparatus which is rugged, reliable, and favored by the drivers of cement delivery vehicles, which automatically positions itself to cover the opening formed by the ends of the segments of a folded concrete chute to thereby prevent debris from falling from concrete vehicle chutes while the vehicles are on roads and highways, or in environmentally protected or restricted areas.

SUMMARY OF THE INVENTION

Therefore, it is an object of the invention to provide a chute closure apparatus suitable for use on concrete delivery vehicles, concrete mixers and other reservoirs of flowable materials, such as cement, uncured concrete, gunite, and gravel, which apparatus prevents the unwanted discharge of material from an articulated chute and prevents debris from falling from such a vehicle while it is on roads or highways, thereby preventing property damage, injury or death.

A further object of this invention is to provide a chute closure apparatus that is completely automatic with respect to the self-positioning of the chute closure door to the extent that its operation requires no extra action by a driver or operator.

An additional object of this invention is to provide a chute closure apparatus that is rugged and reliable and which may be operated safely, having no of pinch points which might injure an operator.

Another object of this invention is to provide a chute closure apparatus that may be permanently attached to a chute, is simple and inexpensive to manufacture, has a long useful life, and may be quickly and easily installed.

It is yet an additional object of this invention to provide a chute combined with a closure apparatus that provides full access to the top of the chute when the segments of the chute are unfolded with respect to one another so as not to interfere with normal operator actions and procedures during discharge of the concrete.

Yet another object of this invention is to provide a chute closure apparatus that properly fits and operates on chutes conventional in the art, while also accommodating all of the manufacturing inaccuracies and misalignments that exist in the chutes.

In accordance with these and other objects of the invention, an articulated chute having at least two segments and a self-positioning closure for preventing unintentional discharge of material from the chute is provided. The chute comprises a main segment, having a charging end and a connecting end. The charging end is suitable for communicating with a source of flowable material, such as fluid concrete, cement, gunite or gravel, wherein the connecting end forms a connecting end rim, and wherein the main segment comprises means for rotatably connecting to a delivery segment. A delivery segment, adjacent to the main segment and rotatably connected thereto, wherein the delivery segment has a mating end and a discharge end, and wherein the mating end forms a mating rim i) for reversibly and sealably connecting to the connecting end rim of the main segment to thereby form a continuous discharge path for the flowable material when the chute is in an unfolded position, and ii.) for forming, with the connecting end rim, a sealable opening, when the main segment and the delivery segment are rotated with respect to one another into a folded position.

The chute is also provided with a closure plate bracket, for rotatably attaching a closure plate, wherein the closure plate bracket is disposed on the connecting end of the delivery segment at a position which is distal to the means for rotatably connecting the delivery segment to the main segment. In addition, the chute comprises a closure plate, rotatably connected to a closure plate bracket, wherein the closure plate has a sealing face, an outer face, and at least one attachment point for attaching at least one biasing means to the closure plate, so that the sealing face of the closure plate is drawn into contact with the sealable opening when the main segment and the delivery segment are rotated with respect to one another into a folded position. The chute comprises at least one means for biasing the closure plate i) toward the sealable opening when the main segment and the delivery segment are rotated with respect to one another into a folded position to thereby seal the sealable opening, and ii) away from the discharge path when the main segment and the delivery segment are rotated with respect to one another into an unfolded position to thereby clear the discharge path so that the chute can articulate controllably between the folded position and the unfolded position.

In accordance with other objects of the invention, the flowable material can be a cementitious material such as Portland cement, cement and stone aggregate, and gunite. In accordance with still other objects of the invention, the means for biasing the closure plate may be disconnected from the plate so that the plate may be freely rotated to any position and, the plate may be rotated to be clear of the sealable opening and the discharge path when the segments of the chute are rotated with respect to one another into a folded position.

In accordance with yet other objects of the invention, the chute comprises a latch for securing the closure plate in a sealing position over the sealable opening when the main segment and the delivery segment are rotated with respect to one another into a folded position. Suitable means for biasing the closure plate include one or more selected from the group consisting of compression springs, tension springs, torsion springs, springs formed of composite materials, rubber cords, synthetic rubber cords, elastic cords, hydraulic pistons, and cable systems comprising pulleys, cables and weights. Further, the closure plate may comprise one or more materials from the group consisting of metals, hard rubber, plastics, composite materials and wood.

In accordance with further objects of the invention, the closure plate comprises an offset to provide finger clearance between the plate and the mating rim of the end segment when the main segment and the delivery segment are rotated with respect to one another into a folded position, and may comprise at least one handle.

Means for biasing the closure plate may comprise an elastic cord in tension or an elastic cord in tension disposed within a tube of sufficient length so that the tube comprises a stop for the plate when the segments are in an unfolded position to thereby hold the plate at a predetermined position.

In accordance with further objects of the invention, means for attaching the chute to a cement delivery vehicle may be provided. Also, the segments of the chute may be rotatably attached to one another by at least one hinge, and a latch may be provided for securing the closure plate over the sealable opening when the segments are in a folded position. Moreover, the sealing surface of the closure plate may comprise a deformable ring disposed to engage the mating rim and the connecting rim when the segments are in a folded position.

In accordance with other significant objects of the invention, a self-positioning closure for sealing an articulated chute wherein the chute has at least two segments is provided. A self-positioning closure according to the invention is adaptable to chutes wherein a main segment has a charging end suitable for communicating with a source of flowable material, and a connecting end, the connecting end forms a connecting end rim and comprises means for rotatably connecting to the delivery segment, and the delivery segment is disposed adjacent to the main segment and is rotatably connected thereto and has a mating end, the mating end forms a mating rim for reversibly connecting to the connecting end rim of the main segment, and the main segment and the delivery segment form a discharge path for the flowable material when the segments are rotated with respect to one another into an unfolded position.

A self-positioning closure according to the invention comprises a closure plate bracket for rotatably attaching a closure plate, wherein the closure plate bracket is disposed on the connecting end of the delivery segment at a position which is distal to the means for rotatably connecting the delivery segment to the main segment, the closure plate is rotatably connected to the closure plate bracket, the closure plate has a sealing face, an outer face, and at least one attachment point for attaching at least one biasing means to the closure plate, and the sealing face of the closure plate is drawn into contact with the sealable opening when the main segment and the delivery segment are rotated with respect to one another into a folded position, and includes at least one means for biasing the closure plate i) toward the sealable opening when the main segment and the delivery segment are rotated with respect to one another into a folded position, and ii) away from the discharge path when the main segment and the delivery segment are rotated with respect to one another into an unfolded position, wherein the chute can articulate controllably between the folded position and the unfolded position.

In summary, the present invention accomplishes all of the above by providing a very substantial chute closure door, made of, for example, steel, aluminum, fiberglass or other rigid plastics or composite materials, which pivots preferably from a steel bracket, which is permanently welded to existing chutes. The chute closure plate may be held against the chute by elastic cords, springs, hydraulic pistons, or by any other means for biasing a plate toward a rim or opening in a sealable manner. The chute closure plate and bracket are disposed geometrically to cause the chute closure door to automatically cover the opening formed by the rims of the respective segments when the adjacent segments are rotated with respect to one another into a folded position. Moreover, the chute closure plate automatically articulates across the rim of the delivery segment to be disposed of the discharge path when the adjacent segments of the chute segments are rotated into an unfolded position. Furthermore, when necessary, the biasing means, such as for example elastic cords, may be disconnected to allow the closure plate to be rotated away from the discharge path when the segments of the chute are in an unfolded position, if desired, such as is necessary when discharging freshly mixed concrete into a concrete pumper or otherwise.

The above and other features of the invention will be detailed and explained more completely in the description of the preferred embodiment and the drawings that follow:

BRIEF DESCRIPTION OF THE DRAWINGS

The present invention may be better understood with reference to the following drawings and detailed description of one embodiment of the invention where the above-listed objects and others will become more apparent to one of ordinary skill in the art. In the drawings:

FIGS. 4(A) through (D) show sequentially the rotation of two adjacent segments of the invention as shown in the previous Figures from the folded position in FIG. 4(A) to the unfolded position in FIG. 4(D);

FIG. 5 shows the adjacent segments of the chute of the invention folded and wherein the closure plate has been rotated to clear the discharge path as would be necessary in pouring material in a close or confined space.

DESCRIPTION OF THE PREFERRED EMBODIMENTS

Figure 6:
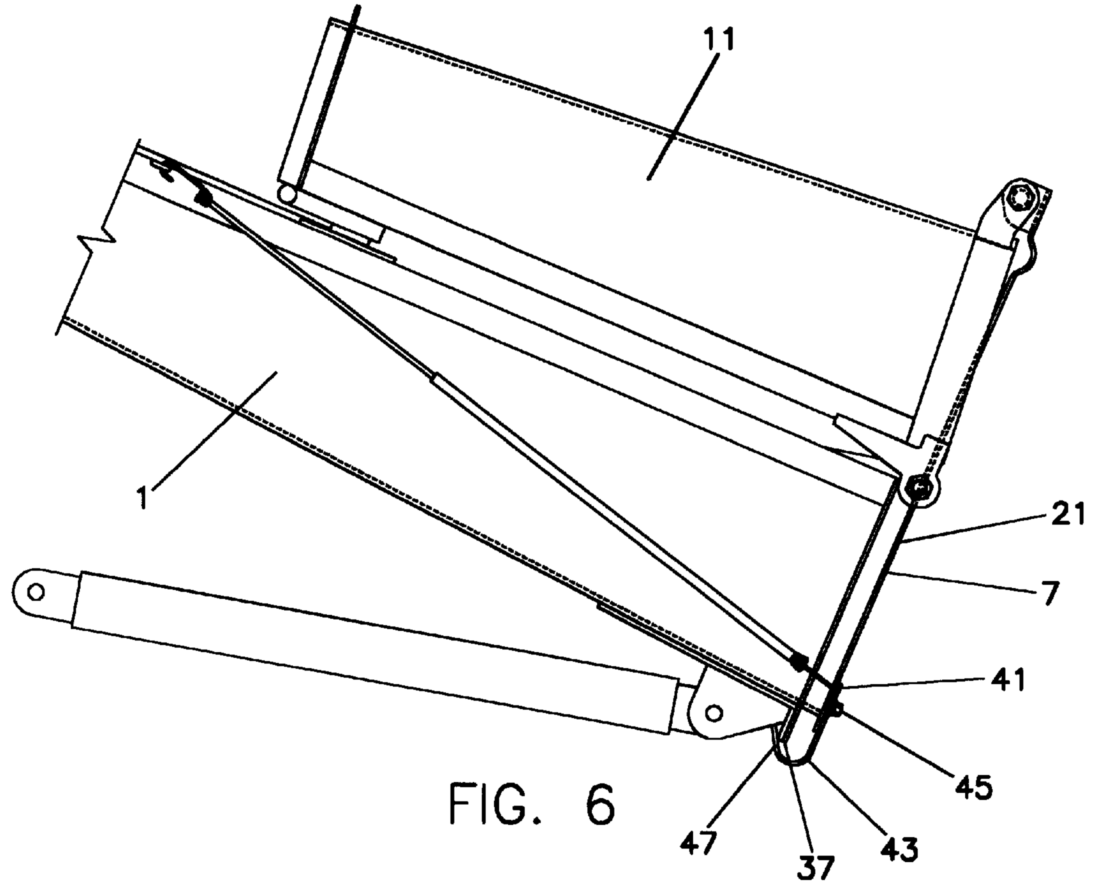
FIG. 6 is a side view showing the embodiment of the invention shown in FIG. 2 and further comprising a latch.
Figure 7:
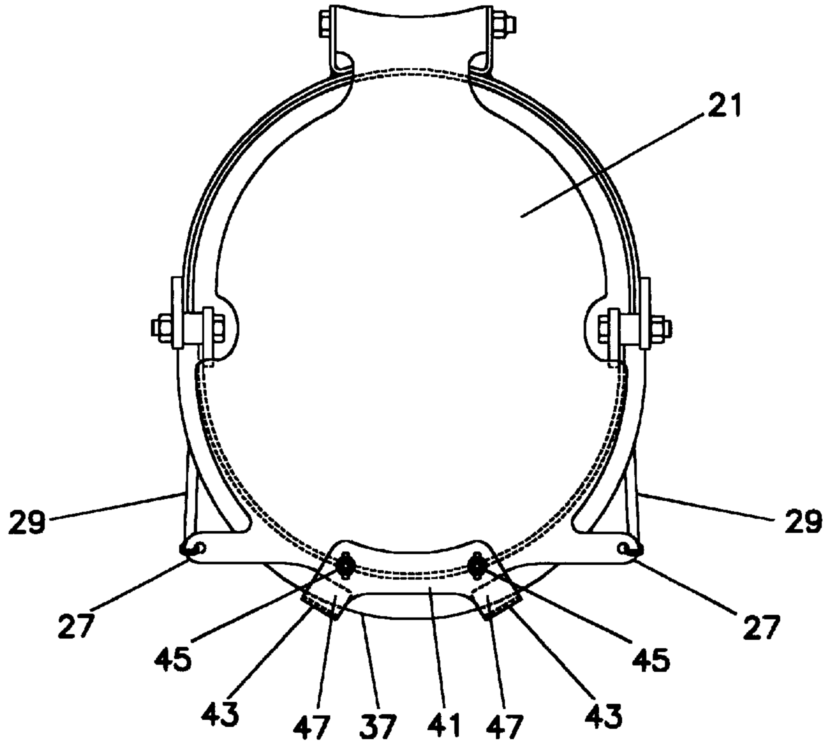
FIG. 7 is a longitudinal view of the invention as shown in FIG. 3 and further comprising the latch as shown in FIG. 6.

Referring now to FIGS. 1 through 7 there is shown a chute closure apparatus according to the present invention as installed on a typical concrete delivery vehicle or other reservoir for fluid concrete or similar flowable materials. All drawings refer to the same embodiment of the present invention and, therefore, numerals in all of the drawings refer to corresponding structures in other drawings. FIGS. 6 and 7 show the embodiment of the invention of FIGS. 1 through 5, and further comprising a self-positioning latch.

Figure 1:
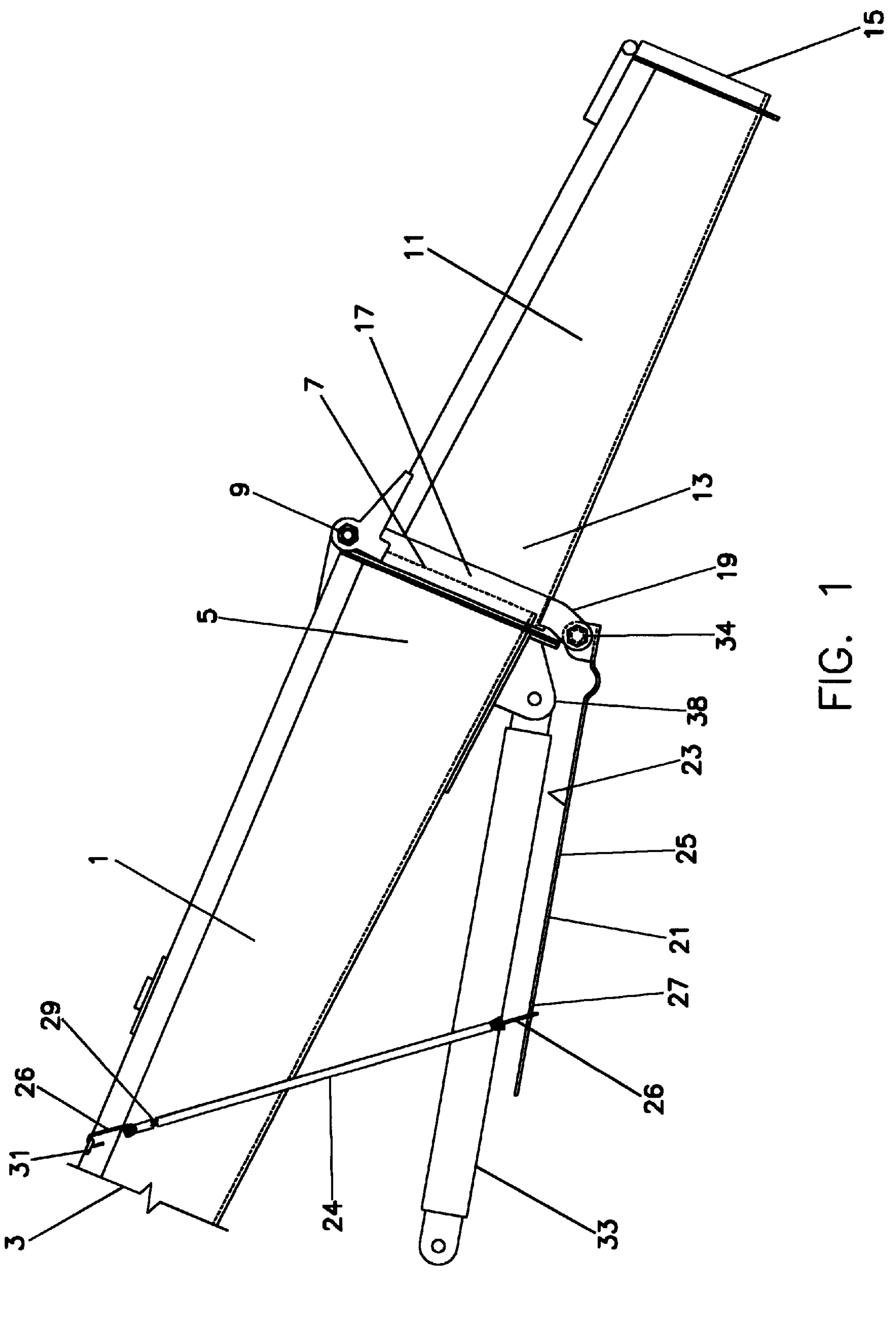
FIG. 1 is a side view of one embodiment of the invention in the unfolded position as it would be used on a typical concrete delivery vehicle.

FIG. 1 is a side view showing an embodiment of the invention in the unfolded position as it would be used on a typical concrete truck. Main segment 1, which is formed of steel, has charging end 3, connecting end 5, and connecting end rim 7, and is rotatably attached to adjacent delivery segment 11 by hinges 9. Delivery segment 11, which is also formed of steel, has discharge end 15, mating end 13, and mating rim 17. The relative dimensions of mating rim 17 and connecting end rim 7 are such that they mate sufficiently tightly to substantially seal the joint formed therebetween when the adjacent segments are in an unfolded position with respect to one another as is shown in FIG. 1. FIG. 1 shows also closure plate 21, having outer face 25 and sealing face 23. Closure plate 21 is rotatably attached to mating end 13 of delivery segment 11 by means of closure plate bracket 19, which is positioned distal to hinges 9. Closure plate 21 is provided with attachment finger 27 for attaching a first end 26 of elastic cord 29, which is disposed within positioning tube 24, to plate 21. Main segment 1 is provided with attachment loop 31 for attaching a second end 26 of elastic cord 29 to charging end 3 of main segment 1 to thereby bias plate 21 away from the discharge path formed by the mating of main segment 1 and delivery segment 11. Positioning tube 24 is provided to set the distance which closure plate 21 is held away from charging end 3 to thereby provide clearance between closure plate 21 and cement truck standoff 33. Cement truck standoff 33 and standoff bracket 38 are shown to depict the relative position of the several elements of the invention with respect to an attached cement delivery vehicle. Means other than elastic cord 29 are suitable for biasing closure plate 21. For example, a hydraulic piston or tension spring may be attached in a manner similar to that shown for elastic cord 29. Another means for biasing closure plate 21 is that of utilizing a torsion spring about connecting pin 34 of closure plate 21. A means for providing additional biasing force on plate 21 when adjacent segments of the chute are in the folded position is latch 41, as detailed below in FIGS. 6 and 7.

Figure 2:
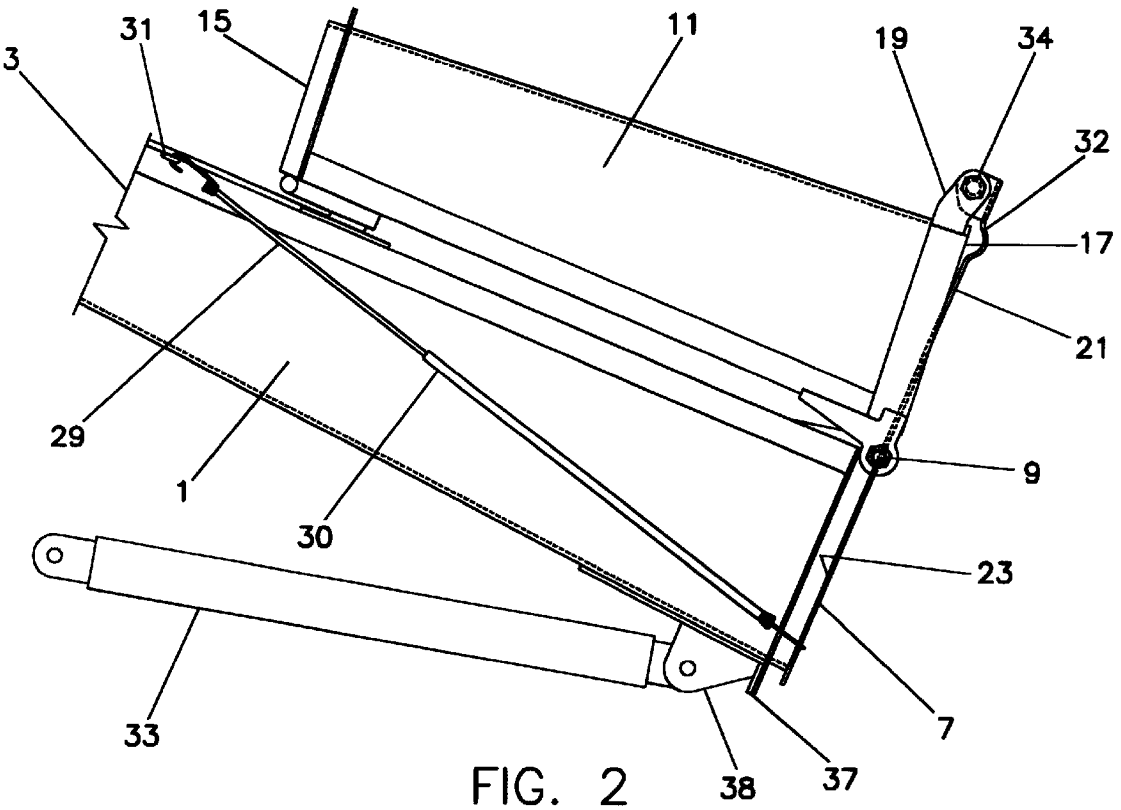
FIG. 2 is a side view showing the embodiment of the invention shown in FIG. 1 wherein adjacent segments of the chute have been rotated with respect to one another into a folded position.

FIG. 2 is a side view showing the embodiment of the invention shown in FIG. 1 wherein the chute has been articulated into the folded position and closure plate 21 has been modified to include radius 32 to provide clearance of connecting end rim flange 37 when delivery segment 11 is rotated with respect to main segment 1 causing closure plate 21 to slide across connecting end rim 7 to arrive at the folded position. In the folded position, the adjacent segments of the chute have been rotated with respect to one another about hinges 9 so that discharge end 15 of delivery segment 11 is resting against a portion of main segment 1 which is proximate to charging end 3 of main segment 1, and sealing face 23 of closure plate 21 is biased against connecting end rim 7 by elastic cord 29 to thereby seal the opening created within connecting end rim 7 and mating rim 17.

Figure 3:
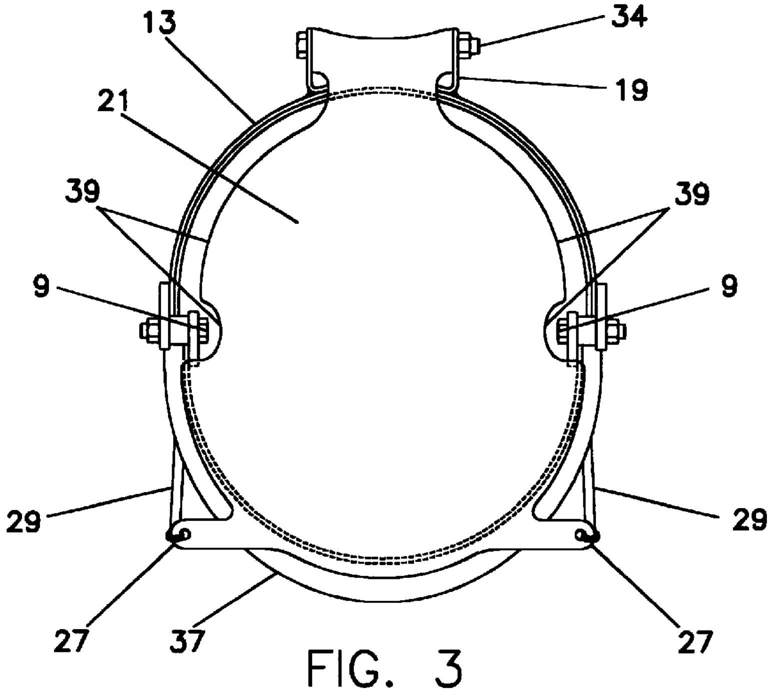
FIG. 3 is a longitudinal view of the invention as shown in FIG. 1 wherein the closure plate is sealably biased over the opening formed by the rims of adjacent segments of the folded chute.

FIG. 3 is a longitudinal view looking toward outer face 25 of closure plate 21 of the invention as shown in FIG. 1 wherein closure plate 21 is biased over the opening formed by the rims of adjacent segments 1 and 11 of the folded chute. Closure plate 21 is provided with cutouts 39 to provide clearance for the plate around hinges 9 and is provided also with attachment fingers 27 for attaching the ends of elastic cords 29 to plate 21 to thereby bias sealing face 23 of plate 21 toward connecting end rim 7 and mating rim 17 of folded segments 1 and 11.

FIGS. 4(A) through (D) show sequentially the rotation of two adjacent segments of the invention from the folded position in FIG. 4(A) to the unfolded position in FIG. 4(D); In FIG. 4(A), closure plate 21 is positioned to seal the opening created by the adjacent folded chute segments. In FIG. 4(B), delivery segment 11 is rotated partially with respect to main segment 1. In FIG. 4(C), delivery segment 11 is rotated further with respect to main segment 1. In FIG. 4(D), delivery segment 11 is rotated fully so that it forms a seal with main segment 1 and closure plate 21 is held clear of the discharge path for fluid concrete.

FIG. 5 shows the adjacent segments 1 and 11 of the invention in the folded position and wherein closure plate 21 has been disconnected from elastic cords 29 and rotated to clear the discharge path as would be necessary in pouring material in a close or confined space. Thus, the present invention is easily adaptable to fit conventional cement delivery vehicles and to use in a confined space.

FIG. 6 is a side view showing the embodiment of the invention shown in FIG. 2 and further comprising latch 41, preferably made of steel plate and provided with curved surfaces as is known in the art. Latch 41 is connected to closure plate 21 by attaching bolts 45, or by rivets, welding, or any other means in the metal fastening art. Latch 41 has latch arms 43 and latch fingers 47. When main segment 1 and delivery segment 11 are rotated into the folded position, latch fingers 47 engage connecting end rim flange 37 to thereby urge closure plate 21 toward connecting end rim 7 of main segment 1 and thus seal the opening created by the folding of adjacent segments 1 and 11.

FIG. 7 is a longitudinal view of the invention as shown in FIG. 6. Latch 41 is connected to closure plate 21 by attaching bolts 45 through longitudinal attaching apertures in latch 41, or by rivets, welding, or any other means in the metal fastening art. Latch 41 has latch arms 43 which are contiguous with latch fingers 47. Latch fingers 47 are sufficiently arcuate to engage connecting end rim flange 37 when main segment 1 and delivery segment 11 are rotated into the folded position. Latch 41 is provided with longitudinal attaching apertures for attaching bolts 45 so that the position of latch 41 with respect to closure plate 21 and connecting end rim flange 37 is adjustable to provide a snug seal with rim 7.

It should be appreciated that the unique design, geometry, and ease of construction, of the present invention provide the described fully automatic features and operation. Thus, plate 21 may open without interfering with any portion of the chute, chute hardware or any portion of the truck. The position of door 21 under segments 1 and 11, provides full access to the top of both chutes for discharge of material, as well keeping plate 21 completely free of obstructions to the operator's activities. Moreover, by providing latch 41, which automatically positions itself to secure closure plate 21 into a sealing configuration when the segments of the chute are rotated into a folded position, an operator of the chute need not latch or unlatch the chute during any phase of its operation.

Installation of the closure plate and related apparatus of the present invention to the segmented delivery chute of a conventional concrete delivery vehicle is extremely easy as will be recognized by one of skill in the art. Specifically, bracket 19, being attached to closure plate 21 by closure plate pivot 34, is placed at a position on the chute distal to hinges 9. Closure plate 21 is rotated as necessary to ensure appropriate clearances with respect to the inside of the segments and hinges 9. Bracket 19 is then welded to main segment 1. To complete the installation, elastic cords 29 are then attached to the closure plate and to points on the main segment.

The present invention has been described in what is considered to be a preferred embodiment. However, it should be noted that the invention can be practiced otherwise than as specifically illustrated and described without departing from its spirit and scope. As one of skill in the art will understand, the present invention is not limited in its application to the details of construction and to the arrangements of the components set forth in the following description and drawings. The invention is capable of various other embodiments and of being practiced and carried out in various ways. One of skill in the art will also understand that the terminology and phraseology employed herein to describe the present invention are illustrative and not limiting.

In this regard, those skilled in the art will appreciate that the concept upon which the present invention is based may readily be utilized as a basis for the designing of other structures, methods, and configurations for carrying out the several purposes of the present invention. Accordingly, it is important that the claims be regarded as including such equivalent embodiments insofar as they do not depart from the spirit and scope of the present invention.

What is claimed is:

1. An articulated chute for concrete vehicles which automatically positions to prevent the accidental discharge of concrete comprising, a) a main chute segment having an end for communicating with a source of flowable concrete in said vehicle, b) a delivery segment rotatably connected to the main segment which forms a discharge path for concrete when in a discharge position and which forms an opening when in a storage position, c) a bracket disposed on said delivery segment at a position distal to the rotatable connection, d) a plate rotatably connected to said bracket, and e) biasing means connected to said plate which automatically positions said plate, i) against said opening in a sealable manner when said delivery segment is in the storage position and, ii) under said main segment when said delivery segment is in the discharge position.

2. The chute of claim 1, wherein the concrete is a cementitious material.

3. The chute of claim 2, wherein said cementitious material is selected from the group consisting of flowable concrete, cement, stone aggregate and gunite.

4. The chute of claim 1, wherein said biasing means can be disconnected from said plate so that said plate can be freely rotated to any position.

5. The chute of claim 4, wherein said plate is under the main segment when the delivery segment is in the discharge position.

6. The chute of claim 1, further comprising a latch for securing the plate over said opening when the delivery segment is in the storage position.

7. The chute of claim 6, wherein said latch automatically latches and unlatches said plate when the delivery segment is rotated without the need for extra action by an operator.

8. The chute of claim 1, wherein said biasing means is selected from the group consisting of elastic cords, compression springs, tension springs, torsion springs, springs formed of composite materials, rubber cords, synthetic rubber cords, hydraulic cylinders, linkages, weights, cable systems and pulleys.

9. The chute of claim 1, wherein said biasing means comprises one or more elastic cords in tension.

10. The chute of claim 9, wherein the elastic cord is disposed within a tube of sufficient length so that said tube comprises a stop for said plate when the delivery segment is in the discharge position to hold said plate in a predetermined position.

11. The chute of claim 1, wherein said plate is made from materials selected from the group consisting of metal, rubber, plastic, composite material and wood.

12. The chute of claim 1, wherein said plate comprises an offset to provide finger clearance between said plate and said chute when the delivery segment is in the storage position.

13. The chute of claim 12, wherein said plate comprises an offset which provides finger clearance between said plate and the end of the delivery segment when the delivery segment is in the storage position.

14. The chute of claim 1, wherein said plate comprises at least one handle.

15. The chute of claim 1, wherein the surface of said plate comprises a deformable ring to seal against one or both of said segments when the delivery segment is in the storage position.

16. The chute of claim 1, wherein said main chute segment and the delivery segment are rotatably connected to each other by one or more hinges.

17. The chute of claim 1, further comprising means for attaching said chute to a concrete vehicle.

18. An articulated chute for concrete vehicles which automatically positions itself to prevent the accidental discharge of concrete having at least two segments comprising, a) a main segment communicating at one end with a source of flowable concrete in said vehicle, b) a delivery segment rotatably connected to said main segment at its other end, wherein said main segment and said discharge segment form a discharge path when said discharge segment is in a discharge position and said discharge segment can be rotated to a storage position to form an opening, c) a bracket disposed on said delivery segment, d) a plate rotatably connected to said bracket, and e) biasing means which bias said plate against said opening when said delivery segment is in the storage position and which bias said plate under said main segment when said delivery segment is in the delivery position and, f) one or more latches which secure said plate to said opening when said delivery segment is in the storage position.

19. The chute of claim 18, wherein said biasing means is selected from the group consisting of elastic cords, compression springs, tension springs, torsion springs, springs formed of composite materials, rubber cords, synthetic rubber cords, elastic cords, hydraulic cylinders, linkages, weights, cable systems and pulleys.

20. The chute of claim 18, wherein said plate is shaped to comprise an offset which provides finger clearance between said plate and other parts of said chute when the delivery segment is in the storage position.

21. The chute of claim 18, wherein said plate comprises finger clearance between said plate and the end of the delivery segment when the delivery segment is in the storage position.

22. The chute of claim 18, wherein said plate comprises a deformable ring to seal against one or more of said segments when said delivery segment is in the storage position.

23. The chute of claim 18, wherein said latch automatically latches and unlatches said plate when said delivery segment is rotated without the need for extra action by an operator.

24. The chute of claim 18, wherein said latch comprises no moving parts.

25. The chute of claim 18, wherein a portion of said latch is an integral portion of said plate.

26. The chute of claim 18, wherein said latch can be adjusted so as to provide a seal between said plate and said chute.

27. The chute of claim 18, wherein said latch is comprised of metal.

28. The chute of claim 18, wherein said latch secures said plate to said main segment in a sealable position over said opening when said delivery segment is in the storage position.

29. The chute of claim 18, wherein said latch automatically latches when said delivery segment is rotated to the delivery position without the need for extra action by an operator.

30. The chute of claim 18, further comprising a handle, wherein said handle is an integral portion of said plate.

31. The chute of claim 18, wherein said biasing means is selected from the group consisting of elastic cords, compression springs, tension springs, torsion springs, springs formed of composite materials, rubber cords, synthetic rubber cords, hydraulic cylinders, weights, linkages, cable systems and pulleys.

32. The chute of claim 18, wherein said biasing means can be disconnected from said plate so that said plate can be rotated to be clear of said opening when said delivery segment is in the storage position.

33. The chute of claim 18, wherein said plate comprises one or more materials selected from the group consisting of metal, hard rubber, plastics, composite materials and wood.

34. The chute of claim 18, wherein said plate comprises at least one handle.

35. The chute of claim 18, wherein said biasing means is disposed within a tube of sufficient length so that said tube comprises a stop for said plate when said discharge segment is in the delivery position to thereby hold said plate in a predetermined position.

36. The chute of claim 18, further comprising means for attaching said chute to a concrete vehicle.

37. A method of providing an automatic chute mechanism for concrete vehicles to prevent the accidental discharge of concrete, said chute connected to said vehicle and including at least two segments rotatably connected including a main segment and a delivery segment, said delivery segment having a storage position and a delivery position, which form an opening with said main segment when said delivery segment is in said storage position and said segments forming a discharge path for flowable concrete material when said discharge segment is in the discharge position, the improvement which comprises:

a) attaching a bracket to said delivery segment, b) rotatably attaching a plate to said bracket, c) attaching biasing means to said plate which i) biases said plate against said opening in a sealable manner when in the storage position, and ii) which also bias said plate under said main segment when in the discharge position.

38. The method of claim 37, further including the step of attaching a latch to said plate to further secure said plate against said opening in a sealable manner when in the storage position.

39. The method of claim 38, wherein said latch automatically latches said plate against said opening in a sealable manner when said delivery segment is in the storage position and automatically unlatches said plate when said delivery segment is in the delivery position.

40. The method of claim 38, wherein said latch can be adjusted so as to provide a seal between said plate and said chute.

41. The method of claim 37, further including the steps of disconnecting said biasing means from said plate when the delivery segment is in the storage position and rotating said plate so that said plate is clear of said opening and the discharge path so that flowable concrete material may be discharged while the discharge segment is in the storage position.

42. The method of claim 37, further comprising the step of disposing said biasing means within a tube so that said tube comprises a stop for said plate when the delivery segment is in the discharge position to thereby hold said plate in a predetermined position.

43. The method of claim 38 wherein said latch is an internal part of said plate.

44. The method of claim 41, further including the step of using a handle on said plate to rotate said plate.

* * * * *